United States Patent
Klein et al.

(10) Patent No.: US 10,528,294 B2
(45) Date of Patent: Jan. 7, 2020

(54) PROVISIONING AND MANAGING VIRTUAL MACHINES FROM A STORAGE MANAGEMENT SYSTEM

(71) Applicant: INTERNATIONAL BUSINESS MACHINES CORPORATION, Armonk, NY (US)

(72) Inventors: Rotem Klein, Kiryat Ono (IL); Nadav Parag, Rehovot (IL); Avraham S. Sabzerou, Ganey Tikva (IL); Moshe Weiss, Petah Tiqwa (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 375 days.

(21) Appl. No.: 15/227,092

(22) Filed: Aug. 3, 2016

(65) Prior Publication Data

US 2018/0039433 A1 Feb. 8, 2018

(51) Int. Cl.
*G06F 9/455* (2018.01)
*G06F 3/06* (2006.01)
*G06F 9/54* (2006.01)

(52) U.S. Cl.
CPC ............ *G06F 3/067* (2013.01); *G06F 3/0604* (2013.01); *G06F 3/0649* (2013.01); *G06F 3/0665* (2013.01); *G06F 9/54* (2013.01)

(58) Field of Classification Search
None
See application file for complete search history.

(56) References Cited

U.S. PATENT DOCUMENTS

| | | | | |
|---|---|---|---|---|
| 7,313,614 B2 * | 12/2007 | Considine | ........... | G06F 11/2074 709/217 |
| 7,818,517 B1 * | 10/2010 | Glade | ................... | G06F 3/0605 709/217 |
| 8,201,166 B2 * | 6/2012 | Garrett | .................... | G06F 9/455 709/203 |
| 8,386,610 B2 * | 2/2013 | Yahalom | ............... | G06F 3/0605 709/226 |
| 8,495,750 B2 * | 7/2013 | Rosu | ....................... | H04W 4/60 726/27 |
| 8,799,894 B2 * | 8/2014 | Lunawat | ............. | G06F 9/45537 718/1 |
| 8,893,306 B2 * | 11/2014 | Rosu | ....................... | G06F 9/545 711/6 |
| 8,904,387 B2 * | 12/2014 | Cervantes | ........... | G06F 9/45558 709/226 |
| 8,984,221 B2 * | 3/2015 | Satoyama | ............. | G06F 3/0605 711/114 |
| 9,292,437 B2 * | 3/2016 | Brant | ...................... | G06F 12/08 |
| 9,400,664 B2 * | 7/2016 | Sakata | .................... | G06F 9/455 |
| 2010/0005222 A1 * | 1/2010 | Brant | ...................... | G06F 12/08 711/6 |
| 2010/0058335 A1 * | 3/2010 | Weber | ................. | G06F 9/45558 718/1 |

(Continued)

*Primary Examiner* — Van H Nguyen
(74) *Attorney, Agent, or Firm* — Griffiths & Seaton PLLC

(57) ABSTRACT

Various embodiments for managing data in a software defined storage environment, by a processor device, are provided. A mediator is used to communicate between a virtual machine controller and a storage management application such that virtual machine operations within the virtual machine controller are initiated by a command from the storage management application.

21 Claims, 3 Drawing Sheets

(56) References Cited

U.S. PATENT DOCUMENTS

| | | | |
|---|---|---|---|
| 2012/0198448 A1* | 8/2012 | Cervantes | G06F 9/45558 718/1 |
| 2014/0181804 A1* | 6/2014 | Sakata | G06F 9/455 718/1 |
| 2015/0074536 A1 | 3/2015 | Varadharajan et al. | |
| 2015/0153959 A1 | 6/2015 | Esaka et al. | |

* cited by examiner

PROVISIONING AND MANAGING VIRTUAL MACHINES FROM A STORAGE MANAGEMENT SYSTEM

BACKGROUND OF THE INVENTION

Field of the Invention

The present invention relates in general computing systems, and more particularly to various embodiments for storage management in virtual computing environments.

Description of the Related Art

Virtualized computing systems, also known as cloud computing systems, provide large-scale computing functionality in applications such as management of large databases and scientific computing, and large-quantity server functionality in applications such as web page servers and other Internet traffic handling. A virtualized computer system typically provides a platform for executing instances of different operating systems, and hosting multiple applications within each operating system's instance. The computer hardware employed is also virtualized in the sense that multiple distributed processors and local memories form a large-scale multiprocessing system with a distributed system memory. Storage within present-day virtualized computing systems is typically manually configured for each particular virtual machine, by a system operator using management tools that configure the storage that will be provided to the particular virtual machine.

SUMMARY OF THE INVENTION

Various embodiments for managing data in a software defined storage environment, by a processor device, are provided. A mediator is used to communicate between a virtual machine controller and a storage management application such that virtual machine operations within the virtual machine controller are initiated by a command from the storage management application.

In addition to the foregoing exemplary embodiment, various other system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
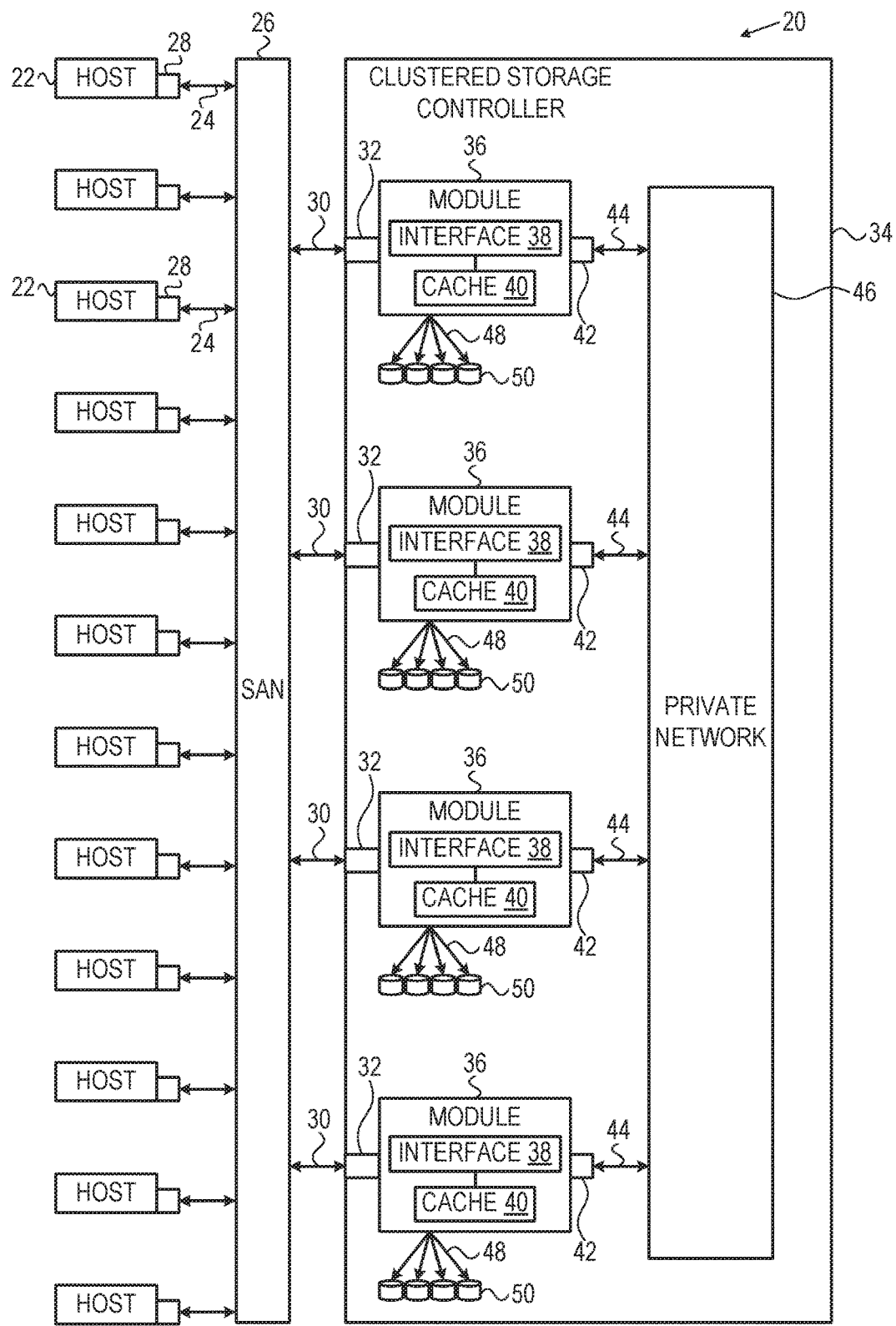
FIG. 1 is a block diagram illustrating a computer storage environment in which aspects of the present invention may be realized.

Described embodiments, and illustrative Figures of various embodiments for managing data in a software defined storage environment are to follow. In the interest of clarity, not all features of an actual implementation are described in this Specification. It will of course be appreciated by the skilled artisan, that in the development of any such actual embodiment, numerous implementation-specific decisions must be made to achieve the developers' specific goals, such as compliance with system-related and business-related constraints, which will vary from one implementation to another. Furthermore, it will be appreciated that such a development effort may be complex and labor-intensive, but would nevertheless be a routine undertaking for those of ordinary skill in the art having the benefit of this Disclosure.

As aforementioned, virtualized computing systems, also known as cloud computing systems or software defined systems, provide large-scale computing functionality in applications such as management of large databases and scientific computing, and large-quantity server functionality in applications such as web page servers and other Internet traffic handling. A virtualized computer system typically provides a platform for executing instances of different operating systems, and hosting multiple applications within each operating system's instance. The computer hardware employed is also virtualized in the sense that multiple distributed processors and local memories form a large-scale multiprocessing system with a distributed system memory. Storage within present-day virtualized computing systems is typically manually configured for each particular virtual machine, by a system operator using management tools that configure the storage that will be provided to the particular virtual machine.

In current software defined storage environments, some management tools related to the abstraction and virtual machine environment are provided that are able to manage/provision the storage underneath virtual machines on a high level, however no storage management applications exist enabling one to manage virtual machines and actually launch virtual machine operations from the storage management application itself (only backward, virtual machine operations may change storage objects). Stated differently, under current technologies, only northbound to southbound management exists from a storage management application to a virtual machine controller, not vice versa. The only available storage management applications that enable one to manage abstraction do so only using third-party services, without the notion of the actual virtual machine performing the operations.

In view of the foregoing, the mechanisms of the illustrated embodiments provide various solutions to managing data in a software defined storage environment. These mechanisms include such functionality as using a mediator to communicate between a storage management application and a virtual machine controller to initiate operations within a virtual machine, as will be further described.

The mechanisms may be applicable to a variety of network topologies and network components as will be further described. Notwithstanding the illustration of some of the functionality attendant to the various embodiments, one of ordinary skill will appreciate that the methodologies herein may be adapted to a wide variety of implementations and scenarios as noted above.

Turning now to FIG. 1, a schematic pictorial illustration of a data processing storage subsystem 20 is shown, in accordance with a disclosed embodiment of the invention. The particular subsystem shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host SAN adapters (HSAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally, or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While not explicitly shown for purposes of illustrative simplicity, the skilled artisan will appreciate that in some embodiments, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Figure 2:
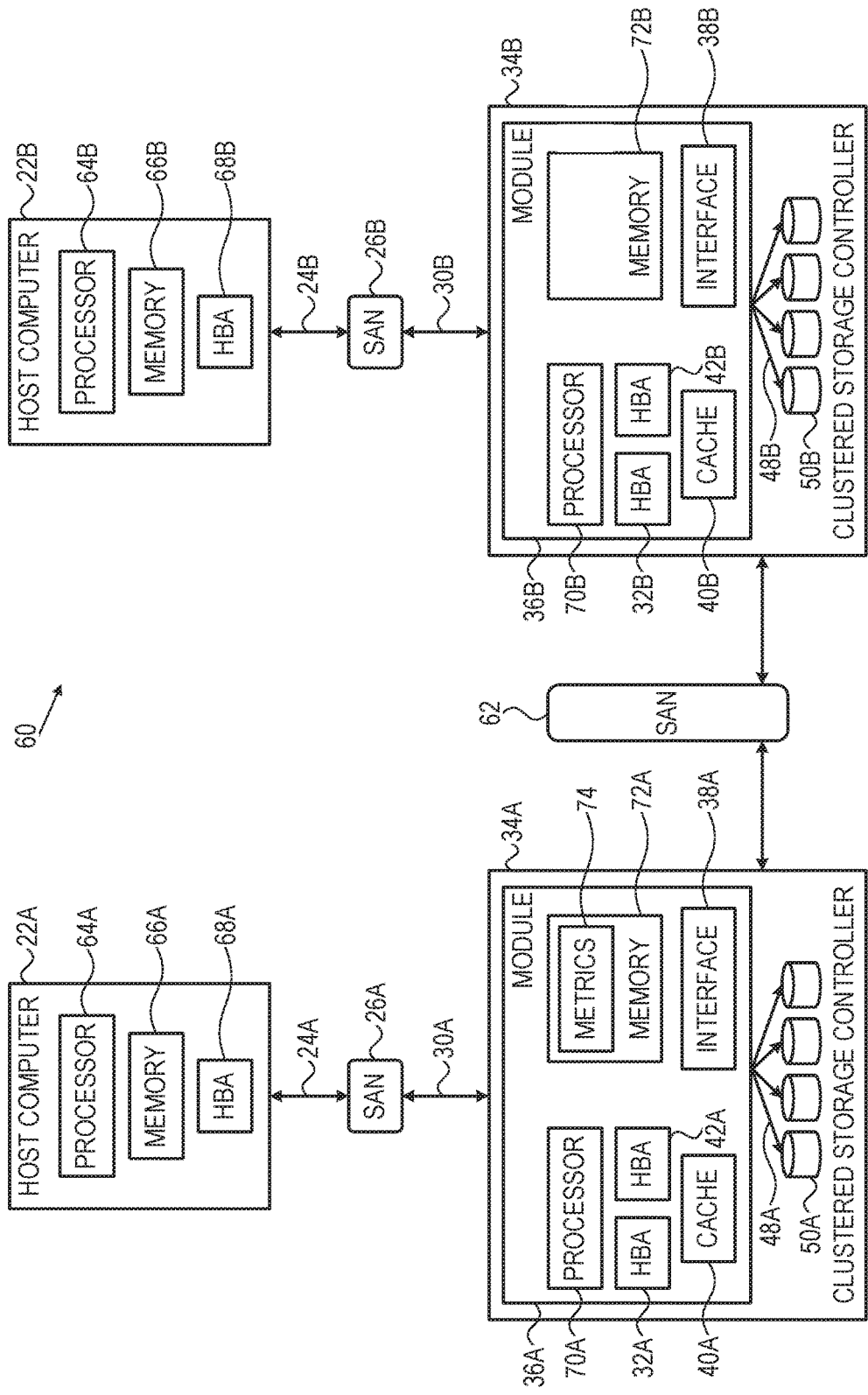
FIG. 2 is a block diagram illustrating a hardware structure of an exemplary data storage system in a computer system in which aspects of the present invention may be realized.

FIG. 2 is a schematic pictorial illustration of facility 60 configured to perform host computer monitoring, in accordance with an embodiment of the present invention. In the description herein, host computers 22, storage controllers 34 and their respective components may be differentiated by appending a letter to the identifying numeral, so that facility 60 comprises a first host computer 22A (also referred to herein as a primary host computer) coupled to a clustered storage controller 34A via a SAN 26A, and a second host computer 22B (also referred to herein as a secondary host computer) coupled to a clustered storage controller 34B via a SAN 26B. In the configuration shown in FIG. 2, storage controllers 34A and 34B are coupled via a facility SAN 62.

Host computer 22A comprises a processor 64A, a memory 66A, and an adapter 68A. Adapter 68A is coupled to SAN 26A via a data connection 24A.

As described supra, module 36A is coupled to storage devices 50A via data connections 48A, and comprises adapters 32A and 42A, a cache 40A, and an interface 38A. Module 36A also comprises a processor 70A and a memory 72A. As explained in detail hereinbelow, processor 70A is configured to establish metrics 74 that indicate a connectivity status of host computer 22A, and store the metrics to memory 72A. In some embodiments, processor 70A may store metrics 74 to storage devices 50A.

Host computer 22B comprises a processor 64B, a memory 66B, and an adapter 68B. Adapter 68B is coupled to SAN 26B via a data connection 24B.

As described supra, module 36B is coupled to storage devices 50B via data connections 48B, and comprises adapters 32B and 42B, a cache 40B, and an interface 38B. Module 36B also comprises a processor 70B and a memory 72B.

Processors 64A, 64B, 70A and 70B typically comprise general-purpose computers, which are programmed in software to carry out the functions described herein. The software may be downloaded to host computers 22A and 22B and modules 36A and 36B in electronic form, over a network, for example, or it may be provided on non-transitory tangible media, such as optical, magnetic or electronic memory media. Alternatively, some or all of the functions of the processors may be carried out by dedicated or programmable digital hardware components, or using a combination of hardware and software elements.

Examples of adapters 32A, 32B, 42A, 42B, 68A and 68B, include switched fabric adapters such as Fibre Channel (FC) adapters, Internet Small Computer System Interface (iSCSI) adapters, Fibre Channel over Ethernet (FCoE) adapters, serial attached SCSI (SAS), and Infiniband™ adapters.

While the configuration shown in FIG. 2 shows storage host computers 22A and 22B coupled to storage controllers 34A and 34B via SANs 26A and 26B, other configurations are to be considered within the spirit and scope of the present invention. For example, host computers 22A and 22B can be coupled to a single storage controller 34 via a single SAN 26.

Figure 3:
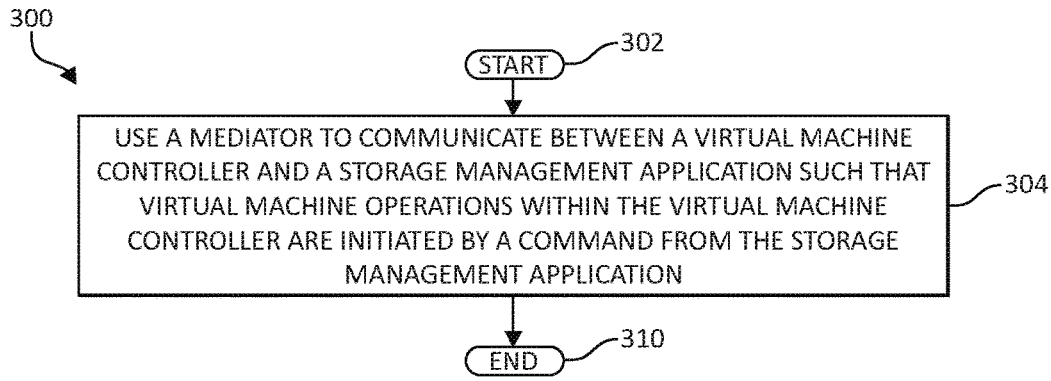
FIG. 3 is a flowchart illustrating a method for managing data in a software defined storage environment in accordance with aspects of the present invention.

Continuing to FIG. 3, a method 300 for managing data in a software defined storage environment, is illustrated, in accordance with one embodiment of the present invention. The method 300 may be performed in accordance with the present invention in any of the environments depicted in FIGS. 1-2, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

Beginning at step 302, a mediator is used to communicate between a virtual machine controller and a storage management application such that virtual machine operations within the virtual machine controller are initiated by a command from the storage management application (step 304). The method ends (step 306).

The present invention provides storage administrators, that generally do not work with other tools than storage management applications, the ability to perform storage operations such as move storage volumes mapped to virtual machines between systems using their existing storage management application to control the storage operations on the virtual machine. As aforementioned, currently to perform such storage operations (for example, rapid growth is forecasted and a storage administrator wants to move the volume to a system with higher free space), the storage administrator must ask a virtual machine administrator to perform the task using their tools within the virtual machine. In this way, storage administrators are not able to manage storage volumes in one tool with the features they've come to know and expect of the storage management application (i.e. trending, planning, statistic functionalities).

Accordingly, in one embodiment, a mediator is used to communicate (southbound) between a virtual machine controller and the storage management application to retrieve, from associated virtual machines, mapping and status information of storage objects for display within the storage management application. The same mediator is then used to communicate (northbound) between the storage management application and the virtual machine controller to hand-off commands from the storage management application to the virtual machine controller such that storage operations are then performed on a virtual machine as directed by the virtual machine controller, using the received commands from the storage management application via the mediator. Thus, storage administrators may use a familiar storage management application to obtain storage object information and direct storage operations which are performed from within the virtual machine itself.

Any change to the storage objects as directed from the storage management application will translate to requiring a virtual machine operation and therefore the change will be on the virtual machine instead of on the storage object (i.e. movement between systems, or backup and restore snapshot objects connected to a virtual machine). The mediator used to communicate between the storage management application and the virtual machine controller (i.e. VCenter™ of VMWare®) uses existing embedded application programming interface (API) commands within the virtual machine controller to activate the storage management operations and/or retrieve the status and mapping information generated to provide back to the storage management application. The mediator itself may comprise a set of API commands, functional computer code, proprietary or programmable hardware, network protocols, etc., or any combination of such.

Consider the following exemplary scenario. When deciding where to create a pool for the use of VMWare® ESX™, a storage administrator is using current data he has access to, which may in reality be different later when hosts start to write to the pool. Let's assume that after some time, the storage administrator, that decided to put the pool on a high-priced storage system with a data reduction feature, sees that the data being written from the host is not reduced/compressed well, and that its trend of reduction is below a previously determined threshold. The storage administrator then decides to move the pool to a lower-priced system to save money for his organization. Using the functionality of the present invention, the storage administrator may then run an online volume migration (OLVM) request from within the storage management application to move the volumes to the lower-priced system. The management server then passes a request of VMotion™ to the VCenter™ in order to start the moving of the volumes. Additionally, the storage administrator is enabled to see all volume mapping of storage objects to the virtual machines using such as the VMWare® VVOL feature in order to obtain trend, forecast of performance, or capacity information, for example, providing the opportunity to make an informed decision on how to manage the storage objects.

Figure 4:
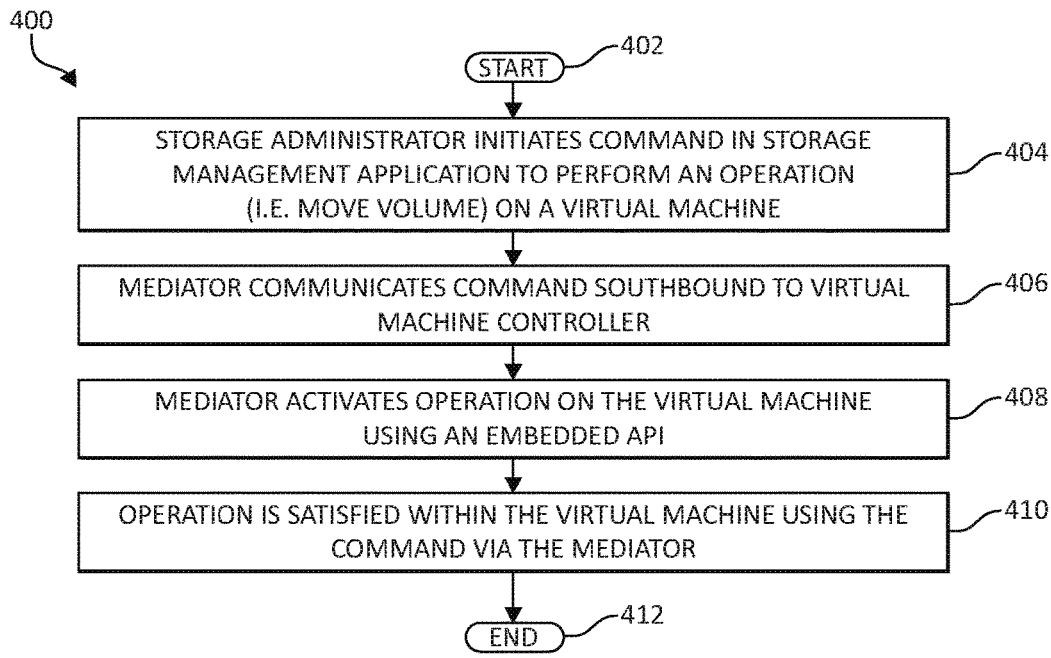
FIG. 4 is an additional flowchart illustrating a method for managing data in a software defined storage environment in accordance with aspects of the present invention.

Advancing to FIG. 4, a method 400 for managing data in a software defined storage environment, is illustrated, in accordance with one embodiment of the present invention. The method 400 may be performed in accordance with the present invention in any of the environments depicted in FIGS. 1-2, among others, in various embodiments. Of course, more or less operations than those specifically described in FIG. 4 may be included in the method 400, as would be understood by one of skill in the art upon reading the present descriptions.

Each of the steps of the method 400 may be performed by any suitable component of the operating environment. For example, in various embodiments, the method 400 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

Beginning (step 402), a storage administrator initiates a command in a storage management application to perform a storage operation, such as moving a storage volume, within a virtual machine to another virtual machine, system, or other location (step 404). The storage administrator is additionally able to obtain status and mapping information of volumes associated with the virtual machine for display within the storage management application.

A mediator communicating between the storage management application and a virtual machine controller relays the command southbound to the virtual machine controller (step 406). Using the received mediator command, the virtual machine controller initiates the storage operation using an existing embedded API within the virtual machine system (step 408). The storage operation is then satisfied within the virtual machine itself using the command received from the storage management application via the mediator (step 410). The method ends (step 412).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for managing data in a software defined storage environment, by a processor device, comprising:
using a mediator to communicate between a virtual machine controller and a storage management application such that virtual machine operations within the virtual machine controller are initiated by a command from the storage management application; wherein the mediator comprises a first set of application programming interface (API) commands not affiliated with any virtual machines controlled by the virtual machine controller; and wherein the storage management application executes within a storage controller server of a mass data storage system and the virtual machine controller executes within a given one of a plurality of servers transacting Input/Output (I/O) to the mass data storage system through the storage controller server via a network.

2. The method of claim 1, wherein the virtual machine operations include storage management operations of storage volumes associated with a virtual machine being controlled by the virtual machine controller.

3. The method of claim 2, further including using the mediator to obtain, by the storage management application, status and mapping information of the storage volumes associated with the virtual machine from the virtual machine controller.

4. The method of claim 2, further including using the mediator to dictate, by the storage management application, moving the storage volumes associated with the virtual machine to an alternate storage mapping.

5. The method of claim 4, wherein the moving is initiated by the command from the storage management application using the mediator to communicate the command to the virtual machine controller.

6. The method of claim 5, further including receiving, by the virtual machine controller, the command from the mediator, and performing the moving by existing means within the virtual machine controller.

7. The method of claim 6, wherein the existing means within the virtual machine controller include a second set of API commands embedded within the virtual machine controller.

8. A system for managing data in a software defined storage environment, the system comprising:
a virtual machine controller;
an storage management application in communication with the virtual machine controller; and
at least one processor device, wherein the processor device:
uses a mediator to communicate between the virtual machine controller and the storage management application such that virtual machine operations within the virtual machine controller are initiated by a command from the storage management application; wherein the mediator comprises a first set of application programming interface (API) commands not affiliated with any virtual machines controlled by the virtual machine controller; and wherein the storage management application executes within a storage controller server of a mass data storage system and the virtual machine controller executes within a given one of a plurality of servers transacting Input/Output (I/O) to the mass data storage system through the storage controller server via a network.

9. The system of claim 8, wherein the virtual machine operations include storage management operations of storage volumes associated with a virtual machine being controlled by the virtual machine controller.

10. The system of claim 9, wherein the at least one processor device uses the mediator to obtain, by the storage management application, status and mapping information of the storage volumes associated with the virtual machine from the virtual machine controller.

11. The system of claim 9, wherein the at least one processor device uses the mediator to dictate, by the storage management application, moving the storage volumes associated with the virtual machine to an alternate storage mapping.

12. The system of claim 11, wherein the moving is initiated by the command from the storage management application using the mediator to communicate the command to the virtual machine controller.

13. The system of claim 12, wherein the at least one processor device receives, by the virtual machine controller, the command from the mediator, and performing the moving by existing means within the virtual machine controller.

14. The system of claim 13, wherein the existing means within the virtual machine controller include a second set of API commands embedded within the virtual machine controller.

15. A computer program product for managing data in a software defined storage environment, by a processor device, the computer program product embodied on a non-transitory computer-readable storage medium having computer-readable program code portions stored therein, the computer-readable program code portions comprising:

an executable portion that uses a mediator to communicate between a virtual machine controller and a storage management application such that virtual machine operations within the virtual machine controller are initiated by a command from the storage management application; wherein the mediator comprises a first set of application programming interface (API) commands not affiliated with any virtual machines controlled by the virtual machine controller; and wherein the storage management application executes within a storage controller server of a mass data storage system and the virtual machine controller executes within a given one of a plurality of servers transacting Input/Output (I/O) to the mass data storage system through the storage controller server via a network.

16. The computer program product of claim 15, wherein the virtual machine operations include storage management operations of storage volumes associated with a virtual machine being controlled by the virtual machine controller.

17. The computer program product of claim 16, further including an executable portion that uses the mediator to obtain, by the storage management application, status and mapping information of the storage volumes associated with the virtual machine from the virtual machine controller.

18. The computer program product of claim 16, further including an executable portion that uses the mediator to dictate, by the storage management application, moving the storage volumes associated with the virtual machine to an alternate storage mapping.

19. The computer program product of claim 18, wherein the moving is initiated by the command from the storage management application using the mediator to communicate the command to the virtual machine controller.

20. The computer program product of claim 19, further including an executable portion that receives, by the virtual machine controller, the command from the mediator, and performing the moving by existing means within the virtual machine controller.

21. The computer program product of claim 20, wherein the existing means within the virtual machine controller include a second set of API commands embedded within the virtual machine controller.

* * * * *